April 4, 1967 L. M. SPRENGERS ETAL 3,312,829
PHOTOELECTRIC ANALOG-TO-DIGITAL CONVERTER ARRANGEMENT
Filed Sept. 12, 1963 2 Sheets-Sheet 1

INVENTORS
LEO M. SPRENGERS
HENRI CASTELIJNS
BY
ATTY.

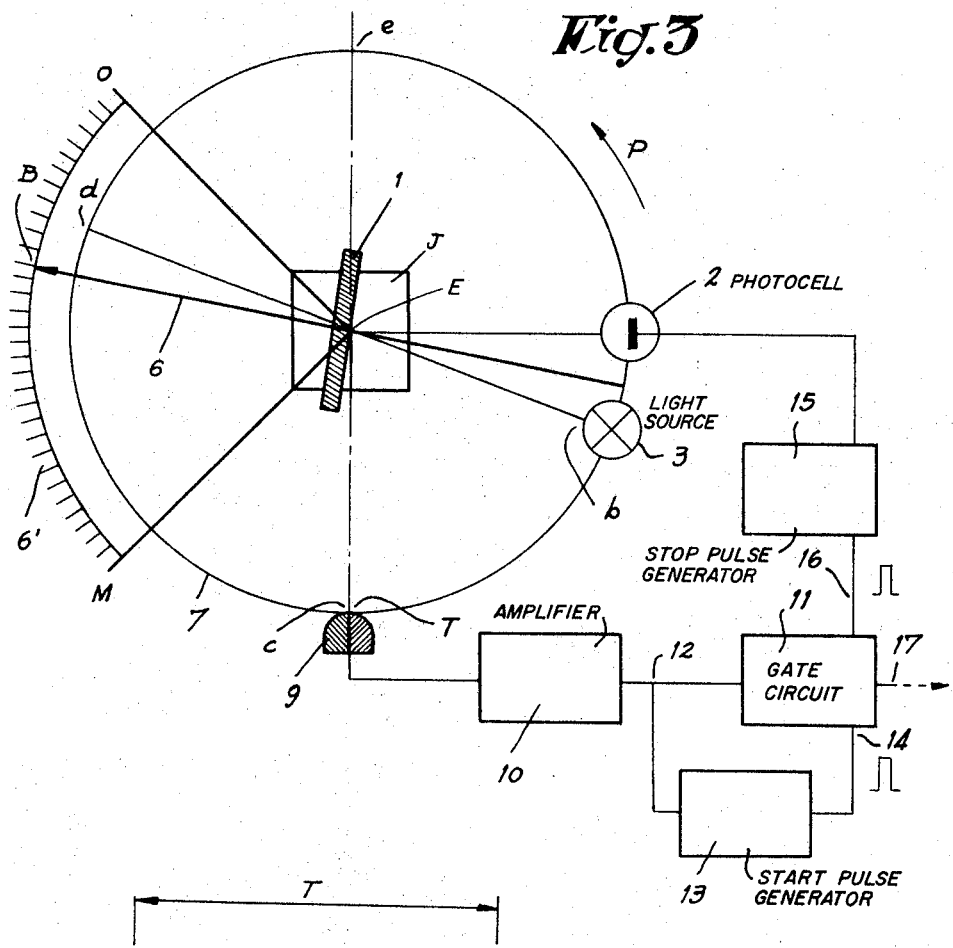
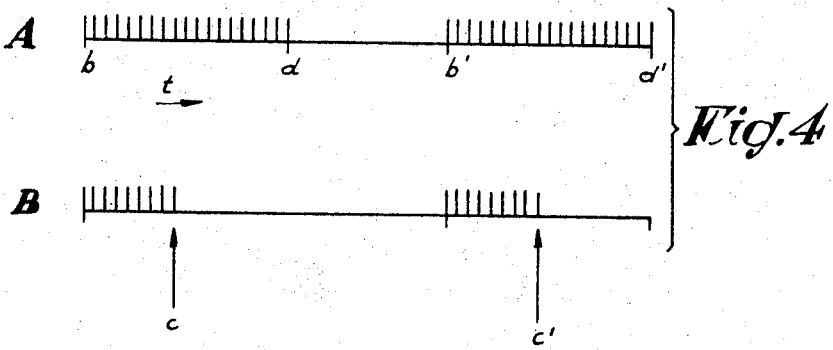

United States Patent Office 3,312,829
Patented Apr. 4, 1967

3,312,829
PHOTOELECTRIC ANALOG-TO-DIGITAL
CONVERTER ARRANGEMENT
Leo M. Sprengers, Lier, and Henri Castelijns, Wilrijk, near Antwerp, Belgium, assignors to Automatic Electric Laboratories, Inc., Northlake, Ill., a corporation of Delaware
Filed Sept. 12, 1963, Ser. No. 308,581
Claims priority, application Belgium, Feb. 27, 1963, 42,377, Patent 628,936
5 Claims. (Cl. 250—231)

The present invention relates to a device for measuring angular displacements and for converting the latter into electric signals. The invention also relates to a measuring system incorporating such a device.

The measurement of angular positions is frequently needed in the technology of measurement and regulation, and more especially in connection with measuring instruments in which one or several electrical quantities, such as current, voltage, power, phase-angle, etc., mechanical quantities such as force, moment, torsion, stretch etc., or other physical quantities, such as temperature, humidity, air pressure etc., are expressed as an angular displacement of a rotating part.

The angular deviation of the rotating part is usually simply read by means of a pointer which moves over a divided scale shaped as a circular segment. For increasing the accuracy of the reading, various means such as mirrors, for eliminating parallax are used, which means however cannot avoid that the final result of the reading depends on the human factor, i.e. on the care with which the observer performs the readings of the instrument.

For facilitating the task of the observer and with the object of obtaining more accurate readings, use has been made for instance of an optical device in which the rotating part of which the angular position must be determined, is fitted with a mirror which reflects the sharply delimited beam of a fixed light source onto a divided scale on which the angular position of the mirror and of the rotating part can thus be read. Considering that when the mirror rotates by an angle δ the angle of incidence and the angle of reflection both vary by this same amount, the angular deviation of the beam of light is equal to twice the actual angle of deviation of the rotating part, which is to be measured, so that the accuracy of the reading can be doubled. On the other hand, the distance between the axis of rotation of the mirror and the scale can be increased at will, so that for a given angular deviation the linear displacement of the light spot on the scale increases proportionally to this distance. In this way it is possible to increase considerably the accuracy of the reading, whereby this possible increase is limited however by the difficulty encountered in setting up the mirror and the scale in a sufficiently stable way for preventing them from vibrating independently.

It is perfectly possible though, to construct electro-optical detectors which are far more accurate, sensitive and reliable than the human eye. With such detectors it is possible, even by means of very weak light pulses, to give rise to an electrical signal which can be amplified and applied to an electronic device.

In the modern technology of measurement and regulation it is often desirable to be able to read and even to record the indications of electrical, mechanical or other instruments, or the angular position of certain machine parts such as shafts, at a distance, at a remote control post say, in order to apply them for instance to the regulation of other quantities with which they are connected in some way. In all automatic control devices, the general aim is to eliminate altogether the human factor; this can be performed by causing the magnitude which is unequivocally determined by the reading of the measuring instrument, and in a general way, the magnitude determined by several different measuring instruments, to act straightway onto the regulating system; in some cases in which there is no simple ratio between the measured magnitudes and the magnitudes which must be controlled, the regulating device will have to be provided with a computer into which the readings of the measuring instruments are entered in order to be converted into a set of appropriate regulating magnitudes.

In all such cases it is convenient to make use of a device which is capable of converting the angular position of the rotating part of the measuring instrument or of any other rotating device onto an electric signal of which one or several parameters determine unequivocally the angular position in question. Such signals can then readily either be transmitted to a distance or be fed straightway into the automatic regulating device.

At present, ample use is being made of digital signals such as series of coded pulses which can express numerical values. In many cases this system is to be preferred, for the following reasons:

(1) Digital signals can be safely transmitted either over large distances and/or despite outside interferences, without any risk of the numerical values expressed thereby from being altered or tampered with;

(2) In numerous instances regulating systems are now equipped with a digital computer; in such cases it is obviously preferable to apply the measured magnitudes to the regulator in the digital form;

(3) The recording of measured magnitudes in digital form can be performed in a simpler and more accurate way than the recording of analogic signals.

The object of the present invention is to create a simple, not too costly device with which it is possible to convert, with a high degree of accuracy and reliability, angular displacements of a rotating part into an electric signal, preferably in the digital form, whereby the angular position is unequivocally characterized. To this effect and according to a principal aspect of the present invention, use is made of an optical scanning device comprising at least one plane mirror fastened to the rotating part of which the angular position must be measured; of a source of radiation which casts a well defined narrow beam (such as a light beam) onto aforesaid mirror, as well as at least a detector responsive to radiation, with a narrowly delimited opening angle. These elements are movably disposed with respect to each other in such a way that only one single configuration of aforesaid elements corresponds to each position of the mirror within the scanning angle, whereby the beam issuing from the source of radiation is reflected by the mirror exactly in the heart of the radiation detector. The device also comprises a driving system which causes the aforesaid elements to go successively through all these configurations.

The mirror shall preferably be fastened in such way to the rotating part that the axis of rotation thereof lies in the same plane as the surface of the mirror, whilst the source of radiation as well as the radiation detector are mounted in such way that the center line of their respective opening angles always passes through this axis of rotation. It is preferable that one of the elements referred to last be fixed with respect to the axis of rotation of the mirror, whilst the other one describes a circular path about this same axis.

In one preferred form of embodiment of the device according to the present invention, the source of radiation is mounted on a drum or disc-shaped rotatable device of which the axis of rotation coincides with that of the mirror, the device in question being for instance a magnetic drum or disc, such as a magnet wheel or suchlike, carrying on part of its periphery or of a line parallel thereto, a series of equally spaced dipoles which can co-operate with a pick-up device mounted close thereto; this drum- or disc-shaped device is driven at constant speed by means of an electric motor. Each time when a magnetic dipoles sweeps over the pick-up device, electric pulses are induced in the latter, these pulses being applied to an electronic circuit which in turn is connected to a radiation detector. This electronic circuit is designed in such way that the pulses applied to its input cease to go through to the output as soon as a signal from the radiation detector is received, whilst at the end of the series of applied pulses, the path is once more opened inside the circuit for letting a new series pass right through to the output. By means of an appropriate disposition of the series of magnetic dipoles on or near the periphery of the drum or disc, it becomes possible to make the instant at which the first electric pulse is induced in the pick-up device coincide with the instant at which the radiation from the source of radiation impinges on the radiation detector when the angle of displacement of the rotating part is equal to zero, so that in this case, not a single pulse can reach the output of the electronic circuit. At any other angular position of the rotating part, a certain number of pulses will appear at the output of the electronic circuit, this number being proportional to the circular arc described by the radiated beam between the instant when the latter passes through zero and the instant when it impinges on the detector.

This series of pulses, which is a measure of the angular displacement to be measured, can either be transmitted straight to a remote control post or be fed into a digital computer or recorder; it can also be applied first to an electronic counter in which the pulses are counted and can be converted into a code signal if required.

In principle, the device according to the present invention can make use of any kind of electromagnetic radiation, within or outside the visible spectrum, which can readily form a beam, be reflected and detected by an electro-optical detector.

These and further characteristics of the present invention will appear more clearly from the following detailed description, given without implying any limitations either expressed or implied of the fundamental idea of the invention, aforesaid description being illustrated by the appended drawings of which:

FIGURE 3 is a top view of the same device, in which however the angular position of the rotatable organ and of the parts connected therewith is different, and whereby the electronic circuit co-operating with this device are illustrated by a block diagram;

FIGURE 4 is a schematic illustration of the series of impulses which are generated, these being shown at (A) as they are applied to the input terminal of the electronic circuit, and at (B) such as they appear at the output thereof when the rotatable part, together with the mirror and pointer attached thereto are in the angular position illustrated in FIGURE 3.

Figure 1:
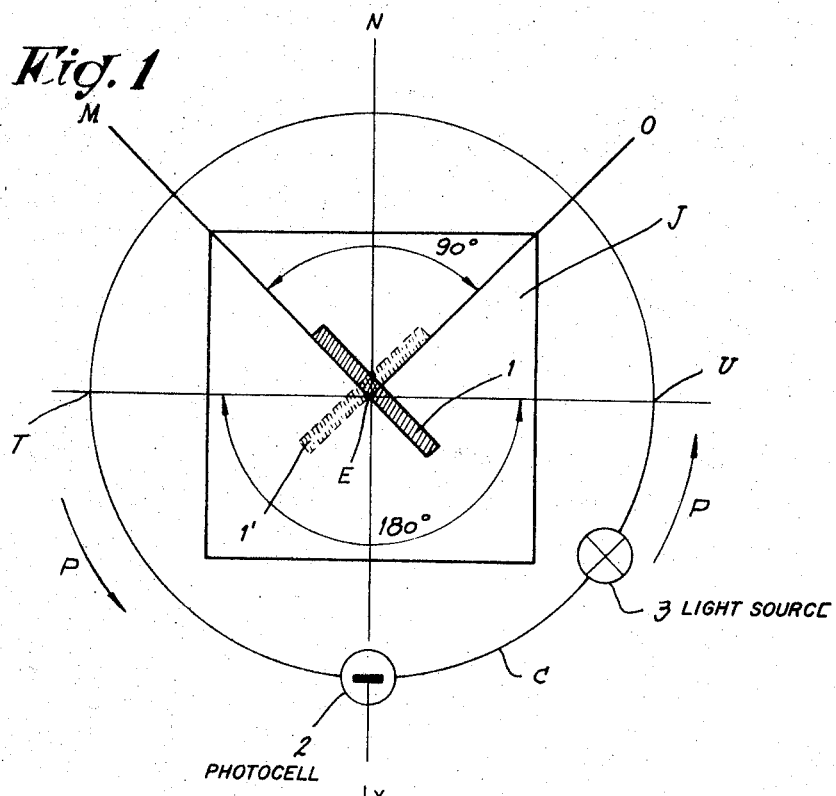
FIGURE 1 is a schematic and very much simplified top view of the scanning device according to the present invention, showing the principle according to which the main parts are disposed with respect to each other.

The schematic diagram of FIGURE 1, which illustrates the relative positions of the main parts, i.e. the mirror 1, the radiation detector 2 (which in the present instance is a photoelectric cell) and the source of light 3, is given by way of explanation of the set up used in this form of embodiment. In this figure, J represents a measuring instrument comprising a rotatable part (5 in FIGURE 2) of which the angular displacement must be measured and whose geometric axis of rotation (X–Y in FIGURE 2) is represented by its horizontal projection E. The mirror 1 is fastened in such way to the rotatable part that this geometric axis of rotation lies altogether in the plane of the mirror. The latter is shown in this figure in two positions marked respectively 1 and 1'. Position 1, which is represented in full lines, is the zero position, i.e. the position in which the deviation of the mobile part of the meter is zero. If the instrument is provided with a pointer, the latter points in the direction E0, i.e. normal to the reflecting surface of the mirror. Position 1', represented in broken lines, in which the pointer points in the direction EM, corresponds to the maximum throw for which the instrument has been designed. In the present instance, it is thus supposed that the maximum throw is 90°. The photoelectric cell 2 is set up at a convenient distance from the axis of rotation at a fixed point located in the vertical plane EN which exactly bisects the angle OEM over which the pointer sweeps. The opening through which the light can impinge on the light-sensitive element is located with respect to the latter in such way that the cell has its highest sensitivity for a beam of light whose axis intersects the axis of rotation in a point which preferably lies in the middle of the mirror. The source of light 3, which can move in a horizontal plane along a circular path C about the axis of rotation, shall preferably be screened on all sides by a screen provided with an opening through which a narrow beam of light is always projected in the direction of aforesaid axis and preferably in such manner that, in all positions of the source of light, the axis of the beam intersects the central axis of rotation at the same point where the latter intersects the axis of the cone of opening of the photoelectric cell 2.

Although in this figure the projection of the photoelectric cell 2 happens to fall exactly on the circular path C, this need not necessarily be so; the distance between the axis of rotation and the photoelectric cell may either be smaller or larger than the radius of aforesaid circular path C, according to circumstances and to the most appropriate design of the instrument. The arrow P shows the direction in which the source of light moves over this circular path.

If in this setup the mirror 1 takes up the zero position shown, the beam of light projected by the light source 3 will, after reflection at the surface of the mirror, impinge exactly on the photoelectric cell 2 at the instant when the light source passes point T. In this zero position, the normal to the reflecting surface of the mirror is represented by the extension of line OE which exactly bisects the angle TE2. If the mirror now moves counter-clockwise through a small angle δ the angle of reflection as well as the angle of incidence both decrease by the same amount δ; it follows therefrom that the light source must now be moved through an angle 2δ in order that the light beam should again impinge on the photoelectric cell, after reflection. It is therefore clear that, when the mirror turns into the position of maximum deviation shown in broken lines, the light source must have moved through an angle of 180°, i.e. must now be at point U in order that the beam light again be projected onto the photoelectric cell after reflection. Whereas the scale for direct reading extends between the lines EO and EM, i.e. over an angle of 90°, the scale of the light pointer extends between points T and U, i.e. over 180°, thus multiplying already the precision of reading by a factor of two.

Figure 2:
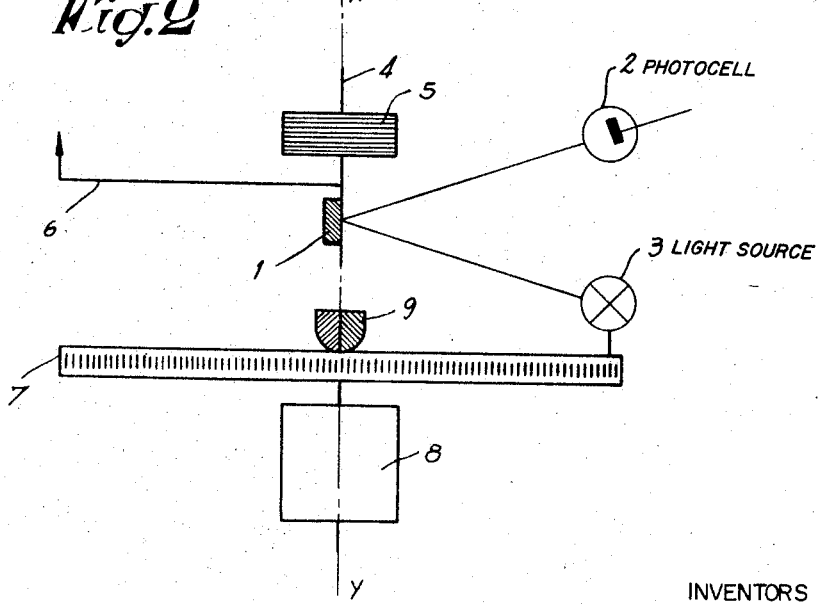
FIGURE 2 is a schematic and also very much simplified side view of a practical application in which a measuring instrument is provided with an optical scanning device according to the present invention.

FIGURE 2 also shows the mirror 1 fastened to the axis 4 of the rotatable part 5, as well as the pointer 6 which can move over the circular scale 6' (FIGURE 3). The mirror is mounted in such way that the geometric axis of rotation X–Y lies in the plane of its reflecting surface, so that the assembly of rotatable part, mirror and pointer rotates as a whole about the axis. This figure also shows that the photoelectric cell 2 and the light source 3 are mounted at different heights in such a way that the former lies on the conic surface described by the light beam cast by the source of light onto the middle of the mirror, as the aforesaid source of light rotates about the central axis.

This source of light 3 is fastened to a magnetic disc 7 which can rotate about the central axis X–Y in a horizontal plane and is driven by a motor 8 which may for instance be a synchronous electric motor. The periphery of aforesaid disc 7, which is lined with a magnetic material, corresponds with the optical scale and carries a set of equidistant magnetic dipoles; these dipoles can act in such way on a pick-up head 9 mounted close to this periphery, that, as they sweep past the pick-up, electric impulses are induced in the latter. The actual position of this pick-up head is that which is illustrated in FIGURE 3, whereas, for the sake of clarity, it has been shown in FIGURE 2 as lying above the disc. The series of dipoles which extends over an angle of at least 180° but less than 360°, is mounted in such way that the first dipole of the series sweeps exactly before the pick-up head 9 at the instant when the light source 3 lies in the zero point of the optical scale (point T in FIGURE 1). In the form of embodiment which is illustrated in FIGURE 3, the pick-up head is also located in this point T. In this case, the first one of the series of dipoles must then lie exactly under the light source, and the series must extend at least over the arc bcd. This is however not a necessary condition; the pick-up head 9 can be displaced over an arbitrary angle to the left or to the right, provided the series of dipoles is displaced over that same angle with respect to the light source.

In FIGURE 3 it is assumed that the meter deviates from the zero position by an amount represented on the pointer scale 6' by the angle OEB. The light source is thereby shown as being in the position b in which its beam after reflection, impinges, on the photoelectric cell. This light source, after leaving the zero position, has thus moved over the arc bc, whereby the magnetic dipoles disposed along this arc have induced an equal number of electric impulses into the pick-up head.

The electronic gear connected to this pick-up head comprises in the main the following items: an amplifier 10, an electronic gate circuit 11 which can be opened and closed by a trigger circuit, a start impulse generator 13 and a stop impulse generator 15. Electronic circuits of these types are known in the art and have been shown, for instance, in U.S. Patent 2,963,222, K. C. Allen, and U. S. Patent 3,033,994, A. Fujimoto et al.

The device operates in the following way: when the disc 7 is driven at a constant speed by the electric motor 8, a train of impulses is induced in the pick-up head 9 as the series of dipoles mounted on the disc sweep over the arc bcd, as illustrated on a time scale in FIGURE 4, this train being repeated at each complete revolution. The train of impulses extends at least over one half of the period of revolution T. This train of impulses, after being amplified in the amplifier 10 is applied to the gate circuit 11 and also to the detector or generator of starting impulses 13. The latter responds at the end of each train of impulses and then generates an impulse which is applied to terminal 14 of the gate circuit 11. This causes the gate to open, so that the impulses of the following train can be led to the output 17 of the gate circuit. Therefore, whilst the disc 7 together with the light source 3 attached thereto, rotates in the direction of arrow P, electric impulses corresponding with the dipoles mounted on the periphery of the disc appear at aforesaid output 17. Due to the fact that these dipoles are fastened solidly into the material, the number of electric impulses will be independent of any variations in the speed of rotation and will always be a steady and reliable measure of the angle which has been swept over. When now the light source arrives in the position b (see FIGURE 3) for which the beam bE impinges, on the photoelectric cell 2 after reflection in the mirror 1, this cell generates an electric impulse which, after amplification and regeneration in the circuit 15, is applied to terminal 16 of the gate circuit 11. This causes the trigger circuit to trip and to close the gate, so that the remaining part of the train of impulses, corresponding with the dipoles mounted along the arc cd, is stopped and can no longer go through to the output 17, as illustrated in FIGURE 4B.

In the example which is given above, the number of impulses which actually appear at the output is thus directly proportional to the angle described by the light source since it passed the optical zero point and therefore also to the angle of deviation which is to be measured, because the magnetic dipoles mounted along the periphery of the disc are equidistant. If it be so desired, aforesaid dipoles can however also be distributed according to another law, such as a logarithmic or a goniometric law, whereby the direct reading scale over which the pointer moves can be divided accordingly. In such case the number of impulses appearing at the output is no longer a linear function of the angle of deviation, but some other function which, for certain purposes, may be more appropriate.

The impulses which are obtained at the output can now be applied to any desired recording or conversion device which may either be located near at hand or at a distance. It is also possible to apply the aforesaid impulses to an electronic counter which can convert the counted number into a code signal which, in turn, can be applied to any desired device for further transformation. Finally, the counting device can also control a numerical tabulator which shows the results of the measurement in visible figures.

By means of aforesaid device it is thus possible to obtain very accurate and very reliable readings which are altogether independent of any shortcomings of the human power of observation. In order to increase still further the accuracy of readings, it suffices to pack the magnetic dipoles closer together, so that more impulses per unit of angular deviation are obtained at the output. In this way, an accuracy of reading can be obtained which is far beyond the accuracy of direct reading. A certain, though small, degree of inaccuracy could still result from the fact that neither the cross-section of the beam of light, nor the angle of opening of the photoelectric cell (solid angle over which the cell is sensitive) can be reduced to the extreme. Due to the presence of this defect, the impulses which are generated in the photoelectric cell are not sufficiently short and may lack a little sharpness, so that the passage of the beam over the center of the cell cannot be determined with absolute certainty.

This drawback can be eliminated to a considerable extent by replacing the single photoelectric cell in the line NE (see FIGURE 1) by two cells with identical characteristics, placed symmetrically on either side of aforesaid line NE. The light beam will then impinge on the first and the second photoelectric cells respectively at equal time intervals before and after its actual coincidence with the line NE. By connecting these two photoelectric cells to a differential circuit (differential detector), the actual coincidence of the beam with the center line NE can be determined with a higher degree of accuracy than would be possible with a single photoelectric cell located on the center line. The output of this differential detector can then be connected to a stroboscopic impulse generator for controlling the closure of the gate circuit.

From the foregoing it will be easily understood that, in principle, it is also possible to exchange the positions of the photoelectric cell and the light source, i.e. to mount the latter in a fixed position and to attach the photocell to the rotating disc.

It is also possible to replace the disc by a magnetic drum, a pole-wheel provided with physical magnetic poles, or even by a cogwheel the teeth of which give rise to a variation of reluctance in the magnetic field set up by a fixed permanent magnet. In the latter case, the cogwheel might even be made of some dielectric material and made to operate in an electrostatic field.

Finally it is also possible not to mount the magnetic dipoles, physical magnetic poles or cogwheel teeth on the disc which carries the source of light, but on a separate disc or drum coupled to the shaft of the former disc by some mechanical means, such as a gear transmission without backlash for instance.

Generally speaking, and within the scope of the present invention, all kinds of modifications may be applied to the construction of the device as well as to its form of embodiment and/or operation and to the mutual cooperation of the various parts and elements of aforesaid device.

What is claimed is:

1. A device for measuring angular displacement of a part thereof which is angularly movable about an axis; said device comprising:
    a disc mounted on a shaft and having regularly spaced magnetic dipoles disposed along a portion of its circumference; means for rotating said disc about said axis at a substantially constant speed of rotation;
    a pick-up head disposed adjacent to and in opposition with a portion of the circumference of said disc, said dipoles for each revolution of said disc inducing in said pick-up head a train of pulses recurring at a predetermined phase of said rotation; an electronic circuit connected to said pick-up head for receiving said train of pulses;
    a plane mirror secured to said angularly movable part, so that the plane of the reflecting surface of said mirror is moved angularly about said axis;
    a radiation source and a radiation detector with narrow opening angles, one of the last two mentioned elements being fixed with respect to said axis and the other being mounted on said disc and the center lines of said opening angles of said elements always intersecting said axis;
    said radiation detector producing, responsive to impingement on said detector of radiation from said source as reflected by said mirror, an electric stop signal for each revolution of said disc, said electronic circuit being connected to said radiation detector for receiving said stop signal whereby the number of pulses of said train generated until the time of occurrence of said stop signal represents a measure of the angular displacement of said part.

2. A device according to claim 1 wherein coincidence of the first pulse of said train with said stop signal occurs when the angular displacement is zero and coincidence of the last pulse of said train with said stop signal occurs when the angular displacement is maximum.

3. A device according to claim 1 wherein said electronic circuit includes; a gate circuit having first, second and third inputs and an output, said gate circuit having open and closed states and transmitting the pulses of said train to its output only when in its open state, said pick-up head being connected to said first gate input; a first trigger circuit connected to said pick-up head to generate a starting pulse derived from said train of pulses and to said second gate input to set said gate circuit to its open state;
    and a second trigger circuit connected to said radiation detector to generate said stop pulse and to said third gate input to set said gate circuit to its closed state; said gate circuit being set to its open state by said first start pulse at the beginning of each train of pulses and being set to its closed state as soon as said stop pulse is generated, whereby the number of pulses which reach the output of said gate circuit is a measure of the length of the arc through which said angularly movable part has been moved.

4. A device for measuring angular displacement of a part thereof which is angularly movable about an axis; said device comprising:
    means continuously rotating about said axis at a substantially constant angular speed of rotation;
    means stationary with respect to said axis and cooperating with said continuously rotating means to provide first periodically recurring signals, said first signals being an angular reference;
    a plane mirror fastened to said angularly movable part, so that the plane of the reflecting surface of said mirror is moved angularly about said axis;
    a radiation sensitive detector and a radiation source, one of the last-mentioned two elements being stationary with respect to said axis and the other being mounted on said continuously rotating means;
    and said radiation detector producing second periodically recurring signals responsive to impingement on said detector of radiation from said source as reflected by said mirror, so that the difference between the time of occurrence of said first signals and said second signals represents a measure of the angular displacement of said part.

5. A device for measuring angular displacement of a part thereof which is angularly movable about an axis; said device comprising:
    means continuously rotating about said axis at a substantially constant speed of rotation;
    means stationary with respect to said axis and cooperating with said continuously rotating means to generate, for each revolution of said continuously rotating means, a train of pulses recurring at a predetermined phase of said rotation;
    a plane mirror fastened to said angularly movable part so that the plane of the reflecting surface of said mirror is moved angularly about said axis;
    a radiation sensitive detector and a radiation source, one of the last two mentioned elements being fixed with respect to said axis and the other being mounted on said continuously rotating means,
    said radiation detector producing, responsive to impingement on said detector of radiation from said source as reflected by said mirror, an electric stop signal for each revolution of said continuously rotating means so that the number of said pulses of said train generated until the time of occurrence of said stop signal represents a measure of the angular displacement of said part.

References Cited by the Examiner

UNITED STATES PATENTS

| | | | |
|---|---|---|---|
| 2,602,847 | 7/1952 | Larew | 250—231 X |
| 3,024,986 | 3/1962 | Strianese et al. | 250—236 X |
| 3,096,444 | 7/1963 | Seward | 250—231 |
| 3,187,186 | 6/1965 | Martin | 250—231 |
| 3,189,886 | 6/1965 | Sonntag | 340—271 |
| 3,240,946 | 3/1966 | Triplett | 250—230 X |

RALPH G. NILSON, *Primary Examiner.*

M. A. LEAVITT, *Assistant Examiner.*